United States Patent
Fujimoto et al.

(10) Patent No.: US 9,260,014 B2
(45) Date of Patent: Feb. 16, 2016

(54) CIRCUIT BREAKER CONTROLLER FOR ELECTRIC TRAIN

(75) Inventors: Yoshiaki Fujimoto, Tokyo (JP); Yoshihito Takigawa, Tokyo (JP); Eiji Kaihara, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 0 days.

(21) Appl. No.: 14/375,866

(22) PCT Filed: Feb. 3, 2012

(86) PCT No.: PCT/JP2012/052546
§ 371 (c)(1),
(2), (4) Date: Jul. 31, 2014

(87) PCT Pub. No.: WO2013/114622
PCT Pub. Date: Aug. 8, 2013

(65) Prior Publication Data
US 2014/0379181 A1    Dec. 25, 2014

(51) Int. Cl.
*B60L 3/04* (2006.01)
*B61L 3/12* (2006.01)
(Continued)

(52) U.S. Cl.
CPC ... *B60L 3/04* (2013.01); *B60L 9/04* (2013.01); *B61L 3/125* (2013.01); *B61L 23/00* (2013.01); *B61L 25/021* (2013.01); *B61L 25/025* (2013.01);
(Continued)

(58) Field of Classification Search
CPC ............... B60L 3/00; B60L 3/04; B60L 3/12; B60L 27/00

USPC ....... 701/19, 409; 246/3; 191/3, 50; 307/10.1
See application file for complete search history.

(56) References Cited

U.S. PATENT DOCUMENTS 4,301,899 A * 11/1981 McSparran et al. ............... 191/3
5,654,634 A *  8/1997 Minderlein .................... 324/218
(Continued)

FOREIGN PATENT DOCUMENTS

JP    51-28909 A     3/1976
JP    2003307633 A   10/2003
(Continued)

OTHER PUBLICATIONS

International Search Report (PCT/ISA/210) mailed on May 1, 2012, by the Japanese Patent Office as the International Searching Authority for International Application No. PCT/JP2012/052546.
(Continued)

*Primary Examiner* — Tan Q Nguyen
(74) *Attorney, Agent, or Firm* — Buchanan Ingersoll & Rooney PC

(57) ABSTRACT

A circuit breaker controller is mounted on each vehicle of an electric train together with a receiver that detects a track antenna beacon installed at a predetermined position before and after the dead section, to control a circuit breaker by detecting the track antenna beacon by the receiver. The circuit breaker controller includes a running-position calculation unit that calculates a running position of the vehicle based on a speed of the electric train, a circuit-breaker control-position calculation unit that calculates a circuit-breaker off-control position, and a circuit breaker control unit that executes off-control of the circuit breaker at a point in time at which the running position and the circuit-breaker off-control position match each other.

13 Claims, 6 Drawing Sheets

(51) Int. Cl.
  *B61L 23/00*   (2006.01)
  *B61L 25/02*   (2006.01)
  *B60L 9/04*    (2006.01)
  *G06F 19/00*   (2011.01)

(52) U.S. Cl.
  CPC .......... *B60L 2200/26* (2013.01); *B60L 2240/12* (2013.01)

(56) References Cited

U.S. PATENT DOCUMENTS

| | | | |
|---|---|---|---|
| 6,915,191 B2* | 7/2005 | Kane et al. | 701/19 |
| 8,825,239 B2* | 9/2014 | Cooper et al. | 701/19 |
| 2005/0240322 A1* | 10/2005 | Peltz et al. | 701/19 |
| 2006/0108872 A1* | 5/2006 | Marra et al. | 307/10.1 |
| 2012/0000739 A1* | 1/2012 | Nogi et al. | 191/50 |

FOREIGN PATENT DOCUMENTS

| | | |
|---|---|---|
| JP | 2007-043849 A | 2/2007 |
| JP | 2009-177879 A | 8/2009 |
| JP | 2011-183937 A | 9/2011 |

OTHER PUBLICATIONS

Written Opinion (PCT/ISA/237) mailed on May 1, 2012, by the Japanese Patent Office as the International Searching Authority for International Application No. PCT/JP2012/052546.

Japanese Office Action with English translation corresponding to Japanese Patent Application No. 2013-556173, dated Jul. 7, 2015; 6 pages.

Chinese Office Action with English translation corresponding to Chinese Patent Application No. 201280068727.2, dated Jul. 10, 2015; 10 pages.

Extended European Search Report corresponding to European Patent Application No. 12867446.2, dated Jul. 15, 2015; 7 pages.

Korean Office Action with partial English translation corresponding to Korean Patent Application No. 10-2014-7024283.

* cited by examiner

CIRCUIT BREAKER CONTROLLER FOR ELECTRIC TRAIN

FIELD

The present invention relates to a circuit breaker controller for an electric train.

BACKGROUND

When a train enters a dead section (a section with no power distribution) in a state where a power collector is connected to a main circuit device, an arc is generated between an overhead line and the power collector due to a contact loss, and a device may be damaged. Therefore, when the train passes through the dead section, a vacuum circuit breaker provided between the power collector and the main circuit device needs to be on/off-controlled. Conventionally, there is a method of on/off-controlling the vacuum circuit breaker by installing a track antenna beacon before and after the dead section and detecting the track antenna beacon.

Furthermore, for example, there has been disclosed a circuit interruption technique in which an antenna that detects a trolley voltage is provided at opposite ends of a train formation to detect the dead section beforehand (for example, Patent Literature 1).

CITATION LIST

Patent Literature

Patent Literature 1: Japanese Patent Application Laid-open No. S51-028909

SUMMARY

Technical Problem

The technique described in Patent Literature 1 mentioned above assumes that a first vehicle of the train formation is a trailer with a cab that does not have a power collector, and the dead section is detected beforehand by a length of one vehicle at minimum from the position of the power collector. Furthermore, the technique does not take it into consideration that there is a time lag after executing off-control of the vacuum circuit breaker until the circuit is actually interrupted. Therefore, when the conventional technique is applied, for example, to a configuration in which the first vehicle is a powered vehicle including a power collector, the power collector may have a contact loss after detecting the dead section and before the circuit is actually interrupted.

Further, according to the method of on/off-controlling the vacuum circuit breaker by installing a track antenna beacon before and after the dead section, and detecting the track antenna beacon, if the speed of the train at the point in time at which the circuit is interrupted is slow, the train may stop before the dead section or in the dead section.

The present invention has been achieved in view of the above aspects, and an object of the present invention is to provide a circuit breaker controller for an electric vehicle that can interrupt a circuit reliably before the electric train enters a dead section, while preventing the vehicle from stopping due to circuit interruption at the time of passing through the dead section.

Solution to Problem

In order to solve the aforementioned problems, a circuit breaker controller for an electric train mounted on each vehicle of the electric train together with a receiver that detects a track antenna beacon installed at a predetermined position before and after a dead section, to control a circuit breaker provided between a power collector and a main circuit device by detecting the track antenna beacon by the receiver according to one aspect of the present invention is configured to include: a running-position calculation unit that calculates a running position of the vehicle based on a speed of the electric train; a circuit-breaker control-position calculation unit that calculates a circuit-breaker off-control position at which the circuit breaker is off-controlled according to the speed of the electric train at a point in time at which the receiver detects the track antenna beacon installed before the dead section in a traveling direction; and a circuit breaker control unit that executes off-control of the circuit breaker at a point in time at which the running position and the circuit-breaker off-control position coincide with each other.

Advantageous Effects of Invention

According to the present invention, circuit interruption can be reliably performed before an electric train enters a dead section, while preventing a vehicle from stopping due to circuit interruption at the time of passing through a dead section.

DESCRIPTION OF EMBODIMENTS

Exemplary embodiments of a circuit breaker controller for an electric train (hereinafter, simply "circuit breaker controller") according to the present invention will be explained below in detail with reference to the accompanying drawings. The present invention is not limited to the embodiments.

First Embodiment

Figure 1:
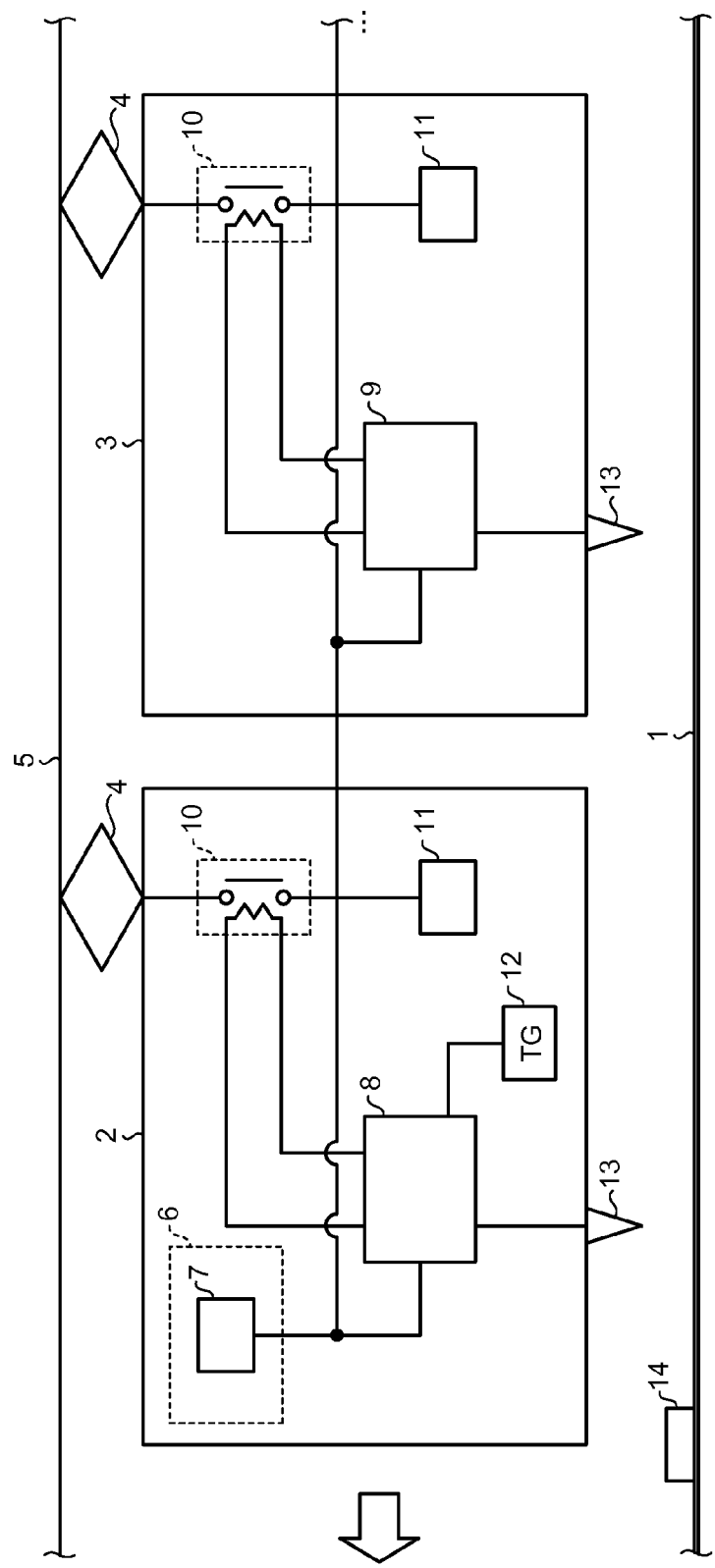
FIG. 1 shows an example of a train to which a circuit breaker controller according to a first embodiment is applied.

FIG. 1 shows an example of a train to which a circuit breaker controller according to a first embodiment is applied. As shown in FIG. 1, in an electric vehicle (an electric train) that runs on a track 1, one formation includes a plurality of vehicles including a first vehicle 2 provided with a power collector 4 that collects power supplied from an overhead line 5 and supplies power to a main circuit device 11, a mid-train powered vehicle 3 similarly provided with the power collector 4, and a mid-train trailer (not shown) without the power collector 4. In an example shown in FIG. 1, an example in which the first vehicle 2 includes the main circuit device 11 and the power collector 4 is shown. However, the configuration is not limited thereto, and the first vehicle 2 may not include the main circuit device 11 and the power collector 4.

A track antenna beacon 14 is installed at a predetermined position on the track 1, and a receiver 13 mounted on each vehicle detects the track antenna beacon 14 to control a vacuum circuit breaker (hereinafter, simply "circuit breaker") 10 provided between the power collector 4 and the main circuit device 11.

A tachogenerator (hereinafter, "TG") 12 that detects the speed of the train based on the rotation speed of wheels, a cab display unit 7 provided in a cab 6, and a central device 8 as a train-information management device are provided in the first vehicle 2, in addition to the power collector 4, the circuit breaker 10, the main circuit device 11, and the receiver 13 described above. A terminal device 9 as a train-information management device is provided in the mid-train powered vehicle 3 in addition to the power collector 4, the circuit breaker 10, the main circuit device 11, and the receiver 13 provided as in the first vehicle 2. The cab display unit 7, the central device 8, and the terminal device 9 are mutually connected between each of the vehicles to share and collectively manage various pieces of information in the train. In the present embodiment, because the functions of the central device 8 and the terminal device 9 are the same, the central device 8 and the terminal device 9 are collectively referred to as "train-information management device 8, 9", unless discrimination thereof is particularly required.

Figure 2:
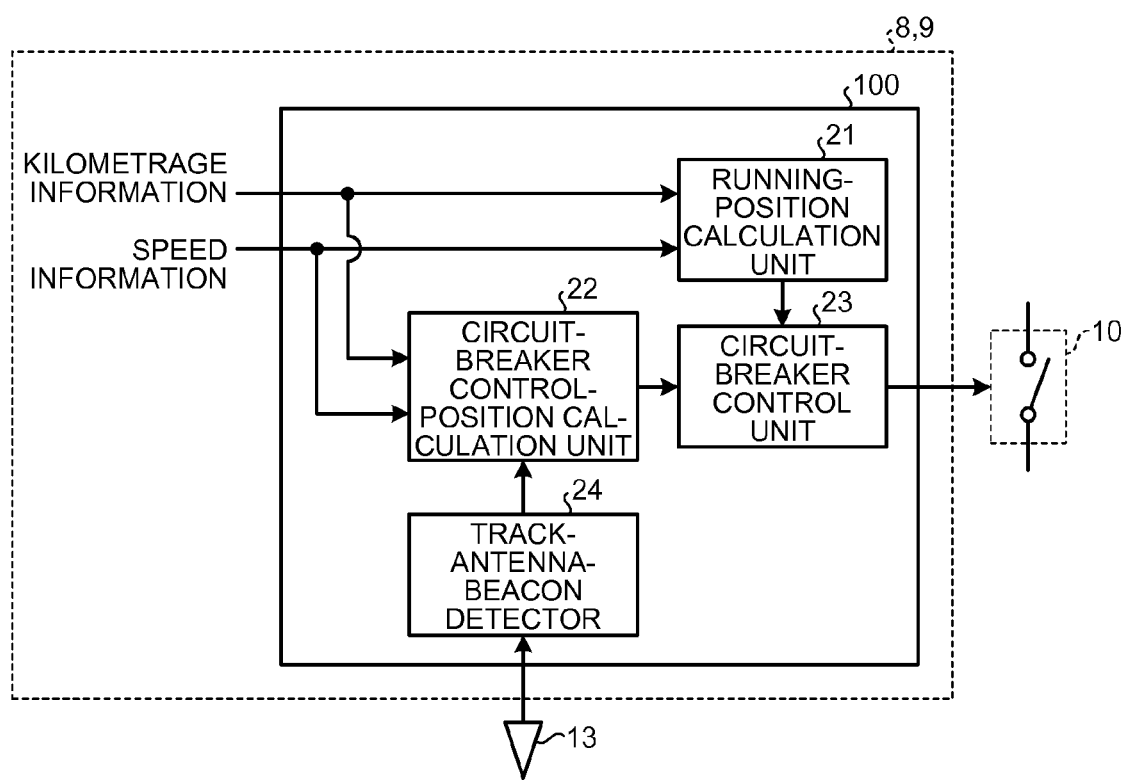
FIG. 2 shows a configuration example of the circuit breaker controller according to the first embodiment.

FIG. 2 shows a configuration example of the circuit breaker controller according to the first embodiment. As shown in FIG. 2, a circuit breaker controller 100 according to the first embodiment is configured in the train-information management device 8, 9 of each vehicle, and includes a running-position calculation unit 21, a circuit-breaker control-position calculation unit 22, a circuit-breaker control unit 23, and a track-antenna-beacon detector 24 to control the circuit breaker 10 on the basis of a reception signal from the receiver 13 and speed information and kilometrage information handled by the train-information management device 8, 9. When the circuit breaker controller 100 is configured in the terminal device 9, the speed information and the kilometrage information need to be obtained from the central device 8 via a network (not shown).

Figure 3:
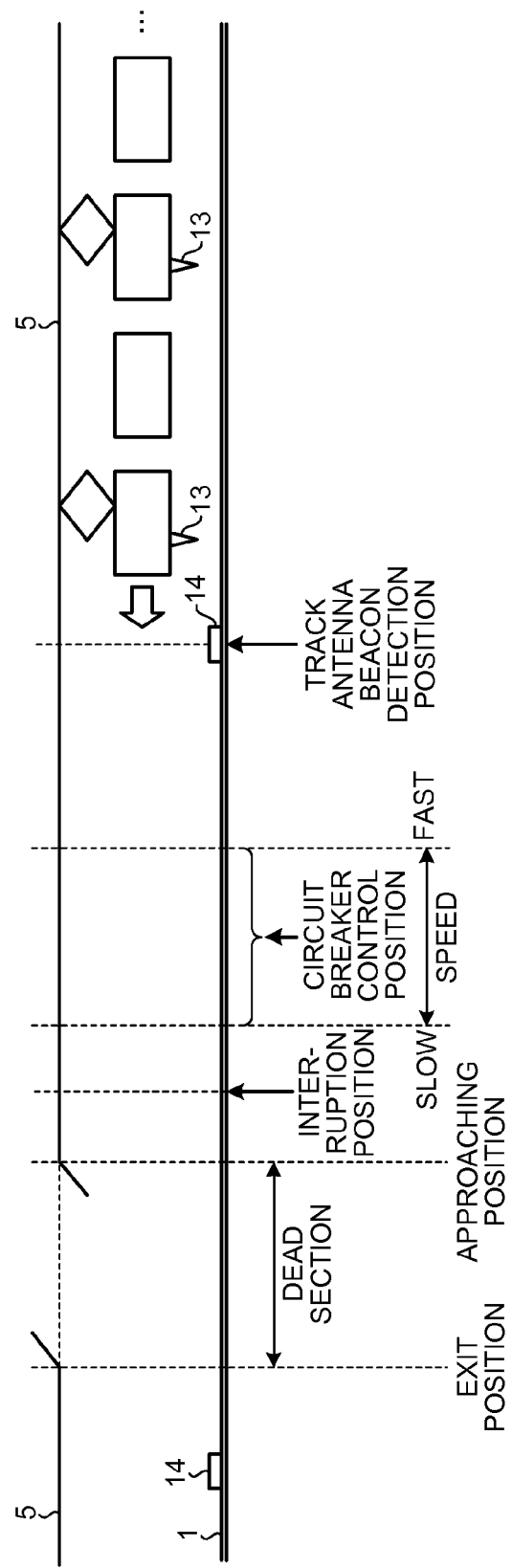
FIG. 3 shows a conceptual diagram of circuit-breaker off-control according to the first embodiment.

Next, the concept of circuit-breaker off-control by the circuit breaker controller 100 according to the first embodiment is explained with reference to FIGS. 1 to 3. FIG. 3 shows a conceptual diagram of the circuit-breaker off-control according to the first embodiment.

As shown in FIG. 3, the track antenna beacons 14 are installed before and after the dead section. In a method of executing on/off-control of the circuit breaker 10 by detecting the track antenna beacon 14, when the train speed is slow at the point in time at which the circuit is interrupted, the train may stop before the dead section or in the dead section.

There is a time lag after off-control of the circuit breaker 10 is executed until the circuit is actually interrupted. Therefore, when the train speed is different, a brake reaction distance after the off-control of the circuit breaker 10 is executed until the circuit is actually interrupted is different. That is, as the train speed becomes faster, the brake reaction distance becomes longer. On the other hand, as the train speed becomes slower, the brake reaction distance becomes shorter.

Accordingly, in the present embodiment, the circuit-breaker off-control position is determined so that circuit interruption is performed at a predetermined interruption position according to the speed at a point in time at which the track antenna beacon 14 is detected before the dead section in a traveling direction. That is, as the train speed becomes faster at the point in time of detecting the track antenna beacon 14 before the dead section in the traveling direction, the circuit breaker 10 is off-controlled at a position further away from an entering position to the dead section. On the other hand, as the train speed becomes slower at the point in time of detecting the track antenna beacon 14 before the dead section in the traveling direction, the circuit breaker 10 is off-controlled at a position closer to the entering position to the dead section.

For example, when the train speed is 40 km/h, and the brake reaction distance after the off-control of the circuit breaker 10 is executed until circuit interruption is actually performed is 33.8 meters, if a circuit interruption is to be performed at a position 10 meters before the entering position to the dead section, the circuit breaker 10 is off-controlled at a position 43.8 meters before the entering position to the dead section.

Further, for example, when the train speed is 10 km/h, and the brake reaction distance after the off-control of the circuit breaker 10 is performed until a circuit interruption is actually performed is 7.5 meters, if a circuit interruption is performed at a position 10 meters before the entering position to the dead section, the circuit breaker 10 is off-controlled at a position 17.5 meters before the entering position to the dead section.

By executing control as described above, even when the train speed is fast, circuit interruption can be reliably performed before entering the dead section.

Further, even when the train speed is slow, the position where circuit interruption is performed can be set to be close to the entering position to the dead section, thereby enabling to prevent the train from stopping before the dead section or in the dead section.

Next, operations of the circuit breaker controller 100 according to the first embodiment are explained with reference to FIGS. 1 to 3.

While the train is running, the running-position calculation unit 21 calculates the current running position of the vehicle according to the speed information and the kilometrage information, and outputs the current running position to the circuit-breaker control unit 23.

As shown in FIG. 3, when the train runs in a direction of an arrow in FIG. 3 and the receiver 13 detects the track antenna beacon 14 before the dead section in the traveling direction, the track-antenna-beacon detector 24 outputs a track-antenna-beacon detection signal indicating that the track antenna beacon 14 has been detected to the circuit-breaker control-position calculation unit 22, based on the reception signal from the receiver 13.

The circuit-breaker control-position calculation unit 22 calculates the circuit-breaker off-control position at which the circuit breaker 10 is off-controlled based on the track-antenna-beacon detection signal, the speed information, and the kilometrage information, according to the train speed at the point in time at which the track antenna beacon 14 installed before the dead section in the traveling direction is detected, and outputs the thus calculated circuit-breaker off-control position to the circuit-breaker control unit 23.

For example, the circuit-breaker control-position calculation unit 22 holds an arithmetic expression indicating a relation between the circuit-breaker off-control position and the train speed beforehand, and calculates a circuit-breaker off-control position based on the arithmetic expression.

Alternatively, it may be arranged such that, for example, the circuit-breaker control-position calculation unit 22 holds a table indicating the relation between the circuit-breaker off-control position and the train speed beforehand, and calculates the circuit-breaker off-control position based on the table.

The circuit-breaker control unit 23 executes off-control of the circuit breaker 10 at a point in time at which the current running position output from the running-position calculation unit 21 and the circuit-breaker off-control position output from the circuit-breaker control-position calculation unit 22 coincide with each other.

Regarding an on-control of the circuit breaker 10 after passing through the dead section, it can be executed at the point in time at which the track antenna beacon 14 on the rear side of the dead section in the traveling direction is detected, or another method can be used. It is needless to mention that the present invention is not limited to the method of the on-control of the circuit breaker 10 after passing through the dead section.

As described above, according to the circuit breaker controller for an electric train of the first embodiment, the circuit breaker is off-controlled according to the train speed at the point in time at which the track antenna beacon installed before the dead section in the traveling direction is detected. More specifically, as the train speed becomes faster at the point in time at which the track antenna beacon before the dead section in the traveling direction is detected, the circuit breaker is off-controlled at a position further away from the entering position to the dead section. On the other hand, as the train speed becomes slower at the point in time of detecting the track antenna beacon before the dead section in the traveling direction, the circuit breaker 10 is off-controlled at a position closer to the entering position to the dead section. Accordingly, even when the train speed is fast, circuit interruption can be reliably performed before entering the dead section, and even when the train speed is slow, the position for performing circuit interruption can be set close to the entering position to the dead section, thereby enabling to prevent the train from stopping before the dead section or in the dead section.

Second Embodiment

Figure 4:
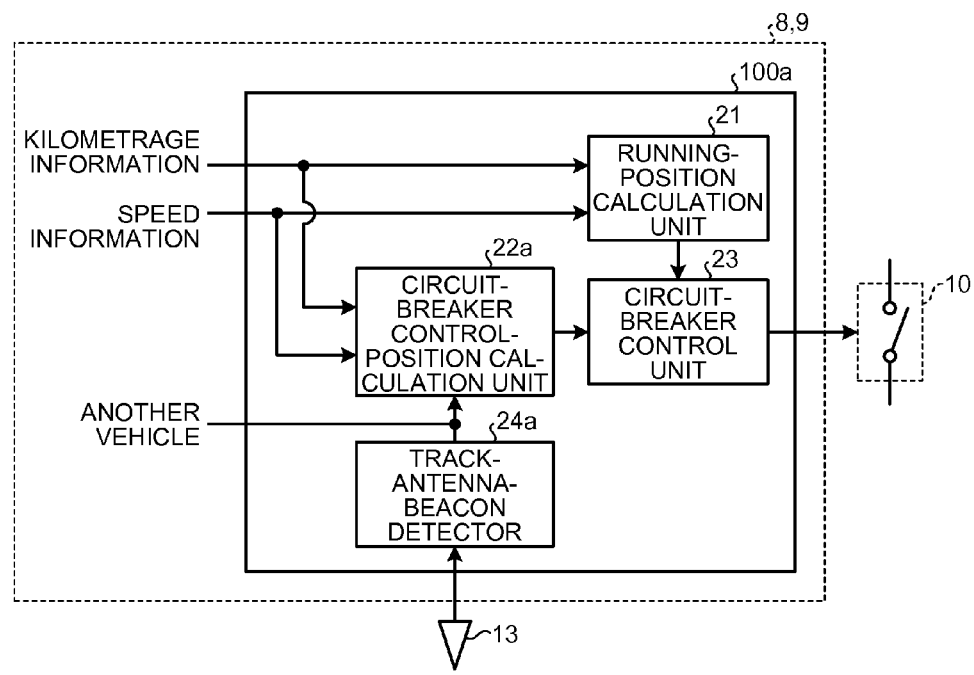
FIG. 4 shows a configuration example of a circuit breaker controller according to a second embodiment.

In the first embodiment, an example of detecting a track antenna beacon by a receiver in the own vehicle has been explained. However, in the present embodiment, an example of a case in which a receiver in an own vehicle cannot detect a track antenna beacon for some reason is explained. FIG. 4 shows a configuration example of a circuit breaker controller according to a second embodiment. Constituent parts identical or equivalent to those of the first embodiment are denoted by the same or like reference signs and detailed explanations thereof will be omitted.

As shown in FIG. 4, a circuit breaker controller 100a according to the second embodiment includes a circuit-breaker control-position calculation unit 22a and a track-antenna-beacon detector 24a instead of the circuit-breaker control-position calculation unit 22 and the track-antenna-beacon detector 24 explained in the first embodiment, which are formed in the train-information management device 8, 9 as in the first embodiment.

The track-antenna-beacon detector 24a ascertains how many vehicles are in front (hereinafter, "car number") of a vehicle on which the track-antenna-beacon detector 24a is mounted (hereinafter, "own vehicle") in the traveling direction, and outputs track-antenna-beacon detection information including the car number, together with the track-antenna-beacon detection signal indicating that the track antenna beacon 14 before the dead section in the traveling direction has been detected.

The track-antenna-beacon detection information including each car number is also output from the track-antenna-beacon detector 24a mounted on each vehicle, and the track-antenna-beacon detection information of each first vehicle 2 and each mid-train powered vehicle 3 for one formation constituting the train is input to the circuit-breaker control-position calculation unit 22a. The circuit-breaker control-position calculation unit 22a similarly ascertains the car number of its own vehicle.

Upon detection of the track-antenna-beacon detection information from other vehicles, the circuit-breaker control-position calculation unit 22a calculates, according to the following equation (1), an own-vehicle track-antenna-beacon detection-expected time t1, which is an estimated time at which the receiver 13 in the own vehicle detects the track antenna beacon 14 before the dead section in the traveling direction, on the basis of other-vehicle track-antenna-beacon detection time t2, which is a time at which the receiver 13 in another vehicle has detected the track antenna beacon 14.

$$t1=t2+d\cdot(a-b) \qquad (1)$$

Here, "d" denotes a retardation coefficient for one vehicle, "a" denotes a car number ascertained by the circuit-breaker control-position calculation unit 22a, and "b" denotes a car number included in the track-antenna-beacon detection information. The retardation coefficient "d" is a positive variable number that changes according to the train speed. As the train speed becomes faster, the retardation coefficient "d" becomes smaller, and, on the other hand, as the train speed becomes slower, the retardation coefficient "d" becomes larger. It may be arranged such that the circuit-breaker control-position calculation unit 22a holds an arithmetic expression indicating a relation between the retardation coefficient "d" and the train speed beforehand, and calculates the retardation coefficient "d" based on the arithmetic expression. Alternatively, it may be arranged such that, for example, the circuit-breaker control-position calculation unit 22a holds a table indicating a relation between the retardation coefficient "d" and the train speed, and calculates the retardation coefficient "d" based on the table.

For example, when a=3, that is, when the circuit-breaker control-position calculation unit 22a in the third vehicle from the front in the traveling direction of the train detects b=1, that is, the track-antenna-beacon detection information output from the track-antenna-beacon detector 24a in the first vehicle of the train, the own-vehicle track-antenna-beacon detection-expected time t1 is a time obtained by adding the time as much as 2d to the other-vehicle track-antenna-beacon detection time t2. That is, a time behind by as much as the time required for two vehicles to pass over the track antenna beacon 14 before the dead section in the traveling direction from the time when the receiver 13 in the first vehicle has detected the track antenna beacon 14 before the dead section in the traveling direction (the other-vehicle track-antenna-beacon detection time t2) is estimated as the own-vehicle track-antenna-beacon detection-expected time t1.

For example, when a=3, that is, when the circuit-breaker control-position calculation unit 22a in the third vehicle from the front in the traveling direction of the train detects b=5, that is, the track-antenna-beacon detection information output from the track-antenna-beacon detector 24a in the fifth vehicle from the front in the traveling direction of the train, the own-vehicle track-antenna-beacon detection-expected time t1 becomes a time obtained by subtracting the time as much as 2d from the other-vehicle track-antenna-beacon detection time t2. That is, a time ahead by as much as the time required for the two vehicles to pass over the track antenna beacon 14 before the dead section in the traveling direction from the time when the receiver 13 in the fifth vehicle from the front in the traveling direction of the train has detected the track antenna beacon 14 before the dead section in the traveling direction (the other-vehicle track-antenna-beacon detection time t2) is estimated as the own-vehicle track-antenna-beacon detection-expected time t1.

When the receiver 13 in the own vehicle cannot detect the track antenna beacon 14 before the dead section in the traveling direction, that is, when the receiver 13 cannot detect the track-antenna-beacon detection information of the car number ascertained by the circuit-breaker control-position calculation unit 22a, the circuit-breaker control-position calculation unit 22a calculates the circuit-breaker off-control position according to the train speed at the own-vehicle track-antenna-beacon detection-expected time t1.

As described above, according to the circuit breaker controller for an electric train of the second embodiment, when the receiver in the own vehicle cannot detect the track antenna beacon before the dead section in the traveling direction, the estimated time at which the receiver in the own vehicle detects the track antenna beacon before the dead section in the traveling direction is calculated by using the time at which the receiver in another vehicle has detected the track antenna beacon before the dead section in the traveling direction. Therefore, even when the receiver in the own vehicle cannot detect the track antenna beacon before the dead section in the traveling direction, the circuit-breaker off-control position can be calculated by using the calculated own-vehicle track-antenna-beacon detection-expected time and circuit interruption can be reliably performed before the own vehicle enters the dead section.

It can be arranged such that when the track antenna beacon is detected by a plurality of vehicles other than the own vehicle, the own-vehicle track-antenna-beacon detection-expected time is calculated by using the track-antenna-beacon detection information detected first, or a plurality of own-vehicle track-antenna-beacon detection-expected times are calculated by using a plurality of pieces of track-antenna-beacon detection information to obtain a mean value of the respective own-vehicle track-antenna-beacon detection-expected times.

Third Embodiment

Figure 5:
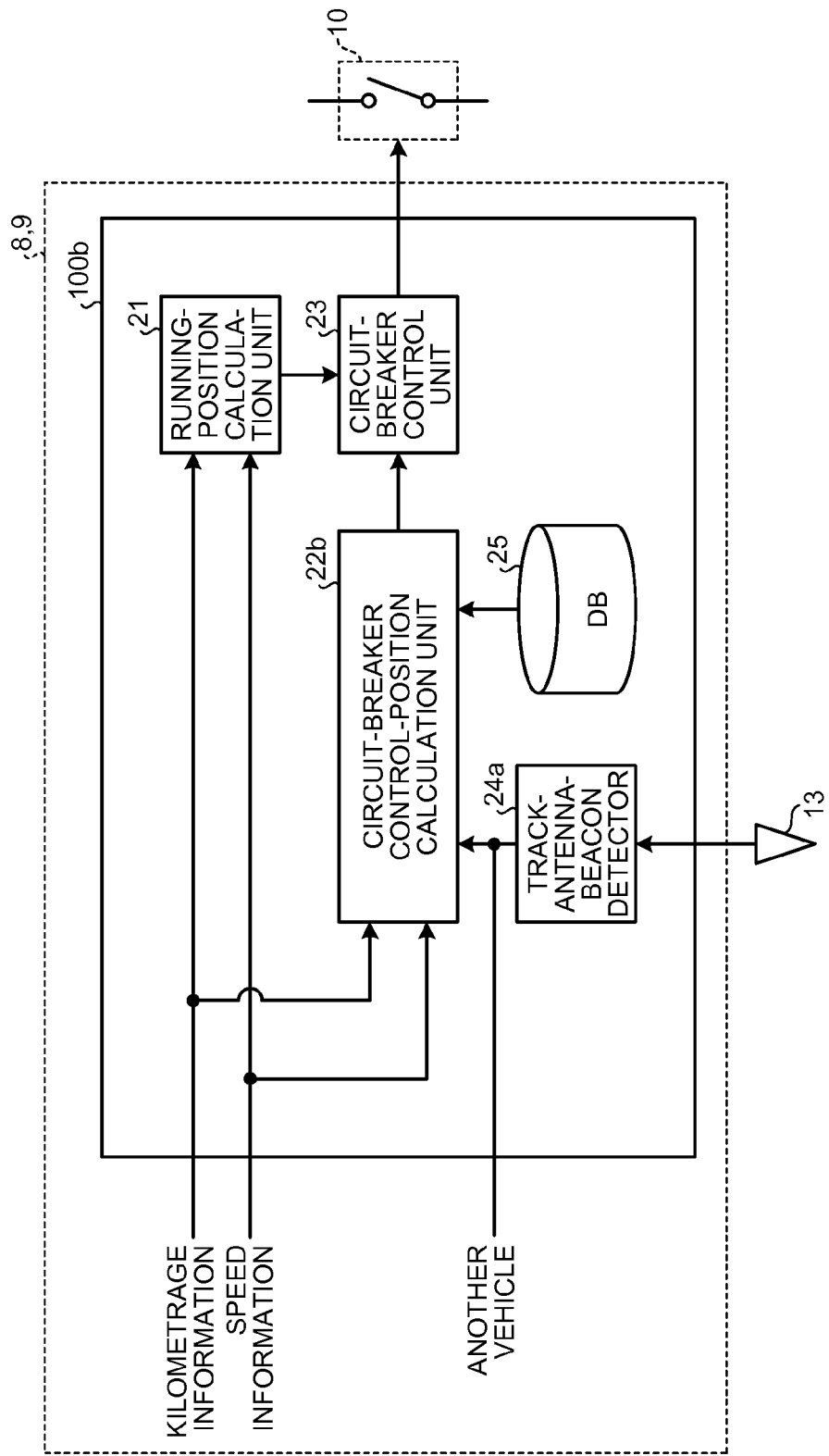
FIG. 5 shows a configuration example of a circuit breaker controller according to a third embodiment.

In the present embodiment, an example in which none of the receivers in the respective vehicles can detect the track antenna beacon before the dead section in the traveling direction is explained. FIG. 5 shows a configuration example of a circuit breaker controller according to a third embodiment. Constituent parts identical or equivalent to those of the second embodiment are denoted by the same or like reference signs and detailed explanations thereof will be omitted.

As shown in FIG. 5, a circuit breaker controller 100b according to the third embodiment includes a circuit-breaker control-position calculation unit 22b instead of the circuit-breaker control-position calculation unit 22a explained in the second embodiment, and also includes a dead-section entering position database (hereinafter, simply "DB") 25 in a route in which the train runs. The circuit breaker controller 100b is configured in the train-information management device 8, 9 as in the first embodiment.

Distance information from a station before the respective dead sections to the entering position of the respective dead sections is stored beforehand in the DB 25 for each dead section in the route in which the train runs.

Figure 6:
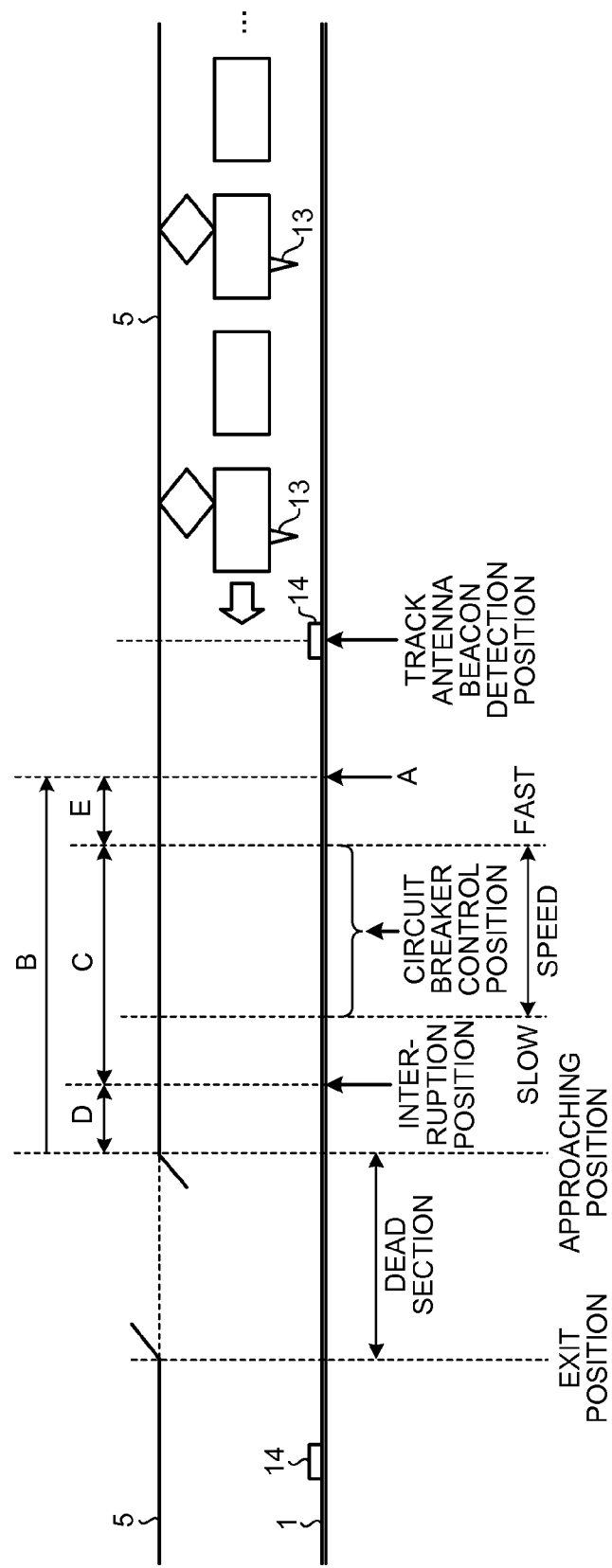
FIG. 6 shows a conceptual diagram of circuit-breaker off-control according to the third embodiment.

FIG. 6 shows a conceptual diagram of circuit-breaker off-control according to the third embodiment. When none of the receivers 13 in the respective vehicles can detect the track antenna beacon 14 before the dead section in the traveling direction, the circuit-breaker control-position calculation unit 22b calculates a circuit-breaker off-control position at a point in time at which the train reaches a point A before the entering position to the dead section stored in the DB 25 by a predetermined distance B set beforehand, according to the train speed at the point A.

The point A shown in FIG. 6, that is, a point before the entering position to the dead section by the predetermined distance B can be specified by the maximum speed of the train assumed beforehand. That is, a critical distance C is first specified at which circuit interruption is performed by off-controlling the circuit breaker 10 while the train is running at the maximum speed assumed beforehand. The predetermined distance B with respect to the critical distance C is then determined by adding a distance D from the entering position to the dead section to a predetermined interruption position and a margin E required for calculating the circuit-breaker off-control position. A point before the entering position to the dead section by the predetermined distance B can be set as the point A.

In this manner, even when none of the receivers 13 in the respective vehicles can detect the track antenna beacon 14 before the dead section in the traveling direction, the circuit-breaker off-control position is calculated at a point in time at which the train reaches the specified point A at the maximum speed of the train assumed beforehand, according to the train speed at the point A. Accordingly, circuit interruption can be performed more reliably before entering the dead section.

As described above, according to the circuit breaker controller for an electric train of the third embodiment, the critical distance is specified at which circuit interruption is performed by off-controlling the circuit breaker while the train is running at the maximum speed assumed beforehand. The predetermined distance with respect to the critical distance is then determined by adding the distance from the entering position to the dead section to a predetermined interruption position and the margin required for calculating the circuit-breaker off-control position. When none of the receivers in the respective vehicles can detect the track antenna beacon before the dead section in the traveling direction, the circuit-breaker off-control position is calculated according to the train speed at a point in time at which the train reaches the position before the entering position to the dead section by the predetermined distance described above. Accordingly, circuit interruption before entering the dead section can be performed more reliably.

The present embodiment has been explained by assuming that the train speed is detected by a TG. However, means for detecting the train speed is not limited thereto, and the train speed can be detected from a voltage applied from or current supplied from a main circuit device to a motor.

The configuration can be made such that a control operation state including whether the track antenna beacon has been normally detected by the respective vehicles or whether the off-control of the circuit breaker has been normally executed is output to the cab display unit provided in the cab of the first vehicle. In this case, a driver can ascertain the control operation state of the circuit breaker controller on a real-time basis, and can respond quickly at the time occurrence of abnormality.

The configuration can also be made such that a control operation history including whether the track antenna beacon has been normally detected by the respective vehicles or the off-control of the circuit breaker has been normally executed, an abnormal operation history when the track antenna beacon is not detected or at the time of abnormality in off-control of the circuit breaker, and the like are recorded in a memory provided in the train-information management device. In this case, for example, a railway company can easily confirm that an abnormal operation has occurred. Such pieces of information can be utilized when a manufacturer examines or analyses as to what kind of measure has been taken in the case of an abnormal operation, thereby enabling to increase maintainability.

The configurations described in the above embodiments are only an example of the configuration of the present invention. These configurations can be combined with other well-known techniques, and it is needless to mention that the present invention can be configured while modifying it without departing from the scope of the invention, such as omitting a part the configuration.

REFERENCE SIGNS LIST 1 track
2 first vehicle (vehicle)
3 mid-train powered vehicle (vehicle)
4 power collector
5 overhead line
6 cab
7 cab display unit
8 train-information management device (central device)
9 train-information management device (terminal device)
10 circuit breaker (vacuum circuit breaker)
11 main circuit device
12 tachogenerator (TG)
13 receiver
14 track antenna beacon
21 running-position calculation unit
22, 22a, 22b circuit-breaker control-position calculation unit
23 circuit-breaker control unit
24, 24a track-antenna-beacon detector
100, 100a, 100b circuit breaker controller

The invention claimed is:

1. A circuit breaker controller for an electric train mounted on each vehicle of the electric train together with a receiver that detects a track antenna beacon installed at a predetermined position before and after a dead section, to control a circuit breaker provided between a power collector and a main circuit device by detecting the track antenna beacon by the receiver, the circuit breaker controller comprising:
a running-position calculation unit that calculates a running position of the vehicle based on a speed of the electric train;
a circuit-breaker control-position calculation unit that calculates a circuit-breaker off-control position at which the circuit breaker is off-controlled according to the speed of the electric train at a point in time at which the receiver detects the track antenna beacon installed before the dead section in a traveling direction; and
a circuit breaker control unit that executes off-control of the circuit breaker at a point in time at which the running position and the circuit-breaker off-control position coincide with each other,
wherein as the speed of the electric train at a point in time at which the track antenna beacon installed before the dead section in the traveling direction is detected becomes faster, the circuit-breaker control-position calculation unit calculates a position further away from an entering position to the dead section as the circuit-breaker off-control position, and as the speed of the electric train at the point in time at which the track antenna beacon installed before the dead section in the traveling direction is detected becomes slower, calculates a position closer to the entering position to the dead section as the circuit-breaker off-control position.

2. The circuit breaker controller for an electric train according to claim 1, wherein the circuit-breaker control-position calculation unit holds an arithmetic expression indicating a relation between the circuit-breaker off-control position and a speed of the electric vehicle, and calculates the circuit-breaker off-control position according to the arithmetic expression.

3. The circuit breaker controller for an electric train according to claim 1, wherein the circuit-breaker control-position calculation unit holds a table indicating a relation between the circuit-breaker off-control position and a speed of the electric train, and calculates the circuit-breaker off-control position according to the table.

4. The circuit breaker controller for an electric train according to claim 1, wherein when the receiver installed in the vehicle together with the circuit breaker controller does not detect the track antenna beacon installed before the dead section in the traveling direction, the circuit-breaker control-position calculation unit calculates the circuit-breaker off-control position based on an other-vehicle track-antenna-beacon detection time at which any one of the receivers installed in other vehicles than the concerned vehicle has detected the track antenna beacon.

5. The circuit breaker controller for an electric train according to claim 4, wherein the circuit-breaker control-position calculation unit estimates an own-vehicle track-antenna-beacon detection-expected time at which the receiver installed in the vehicle together with the circuit breaker controller detects the track antenna beacon installed before the dead section in the traveling direction based on the other-vehicle track-antenna-beacon detection time, and calculates the circuit-breaker off-control position according to a speed of the electric train at the own-vehicle track-antenna-beacon detection-expected time.

6. The circuit breaker controller for an electric train according to claim 5, wherein when none of the receivers mounted on the respective vehicles can detect the track antenna beacon installed before the dead section in the traveling direction, the circuit-breaker control-position calculation unit calculates the circuit-breaker off-control position according to a speed of the electric train at a position before the entering position to the dead section by a predetermined distance.

7. The circuit breaker controller for an electric train according to claim 6, wherein a control operation state including whether the receivers mounted on the respective vehicles have detected the track antenna beacon normally or whether off-control of the circuit breaker has been normally executed is output to a cab display unit provided in a cab of a first vehicle of the electric train.

8. The circuit breaker controller for an electric train according to claim 7, wherein one or both of a control operation history including whether the track antenna beacon has been normally detected by the receivers mounted on the respective vehicles or off-control of the circuit breaker has been normally executed, and an abnormal operation history including abnormal operations at the time of detection failure of the track antenna beacon or at the time of abnormal off-control of the circuit breaker are recorded in a memory provided in a train-information management device.

9. The circuit breaker controller for an electric train according to claim 6, wherein one or both of a control operation history including whether the track antenna beacon has been normally detected by the receivers mounted on the respective vehicles or off-control of the circuit breaker has been normally executed, and an abnormal operation history including abnormal operations at the time of detection failure of the track antenna beacon or at the time of abnormal off-control of the circuit breaker are recorded in a memory provided in a train-information management device.

10. The circuit breaker controller for an electric train according to claim 4, wherein when none of the receivers mounted on the respective vehicles can detect the track antenna beacon installed before the dead section in the traveling direction, the circuit-breaker control-position calculation unit calculates the circuit-breaker off-control position according to a speed of the electric train at a position before the entering position to the dead section by a predetermined distance.

11. The circuit breaker controller for an electric train according to claim 10, wherein a control operation state including whether the receivers mounted on the respective vehicles have detected the track antenna beacon normally or whether off-control of the circuit breaker has been normally executed is output to a cab display unit provided in a cab of a first vehicle of the electric train.

12. The circuit breaker controller for an electric train according to claim 11, wherein one or both of a control operation history including whether the track antenna beacon has been normally detected by the receivers mounted on the respective vehicles or off-control of the circuit breaker has been normally executed, and an abnormal operation history including abnormal operations at the time of detection failure of the track antenna beacon or at the time of abnormal off-control of the circuit breaker are recorded in a memory provided in a train-information management device.

13. The circuit breaker controller for an electric train according to claim 10, wherein one or both of a control operation history including whether the track antenna beacon has been normally detected by the receivers mounted on the respective vehicles or off-control of the circuit breaker has been normally executed, and an abnormal operation history including abnormal operations at the time of detection failure of the track antenna beacon or at the time of abnormal off-control of the circuit breaker are recorded in a memory provided in a train-information management device.

* * * * *